(12) United States Patent
Al-Shafei et al.

(10) Patent No.: US 12,048,922 B2
(45) Date of Patent: Jul. 30, 2024

(54) SYSTEM AND METHOD USING A CONVERTER AND A MOVABLE STORAGE SILO FOR SPENT CATALYST

(71) Applicant: Saudi Arabian Oil Company, Dhahran (SA)

(72) Inventors: Mansour Ahmed Al-Shafei, Saihat (SA); Mahir Abdullah Al-Mumen, Dammam (SA); Akram Abbas Alfliow, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 7 days.

(21) Appl. No.: 17/101,964

(22) Filed: Nov. 23, 2020

(65) Prior Publication Data

US 2022/0161214 A1     May 26, 2022

(51) Int. Cl.
| | | |
|---|---|---|
| *B01J 8/00* | (2006.01) | |
| *B01J 8/04* | (2006.01) | |
| *B07B 1/10* | (2006.01) | |

(52) U.S. Cl.
CPC .............. *B01J 8/002* (2013.01); *B07B 1/10* (2013.01); *B01J 2208/00761* (2013.01)

(58) Field of Classification Search
CPC ...... B01J 8/002; B01J 8/009; B01J 20/28052; B01J 2208/00761; B01J 2208/00884; B01J 2219/30207; B01J 2219/30408; B01J 2219/30416; B01J 2219/3085; B01J 2219/315; B01J 2208/00769; B01J 2208/00672; B07B 1/10

USPC .......................................................... 209/307
See application file for complete search history.

(56) References Cited

U.S. PATENT DOCUMENTS

| | | | |
|---|---|---|---|
| 735,485 A | 8/1903 | Farrell | |
| 973,687 A | 10/1910 | Naylor | |
| 1,212,911 A | 1/1917 | Craine | |
| 1,345,985 A | 7/1920 | Berkshire | |
| 2,899,286 A * | 8/1959 | Miller | B01J 8/008 422/220 |
| 3,758,676 A * | 9/1973 | Goddin, Jr. | C01B 17/0439 423/574.1 |
| 3,792,981 A * | 2/1974 | Hettick | C07C 7/167 585/653 |
| 3,948,764 A * | 4/1976 | Edwards | B07B 1/46 209/250 |
| 5,255,615 A * | 10/1993 | Magaldi | F23J 1/02 110/165 R |
| 6,619,571 B1 | 9/2003 | Hourticolon et al. | |

(Continued)

OTHER PUBLICATIONS

Doerich et al.,. "Behavior of cylindrical steel shells supported on local brackets." Journal of structural engineering 134.8 (2008): 1269-1277.

(Continued)

*Primary Examiner* — Michael McCullough
*Assistant Examiner* — Molly K Devine
(74) *Attorney, Agent, or Firm* — Leason Ellis LLP

(57) ABSTRACT

A system and method use a converter and a movable storage silo for receiving, processing, and transporting spent catalysts. The spent catalysts can be utilized in the manufacture of cement instead of being disposed in landfills. A hydraulic sub-system remove dusts from the spent catalyst prior to storage in the silo.

9 Claims, 4 Drawing Sheets

(56) References Cited

U.S. PATENT DOCUMENTS

| | | | |
|---|---|---|---|
| 8,371,794 B2* | 2/2013 | Magaldi | F23K 3/00 |
| | | | 414/291 |
| 9,617,066 B2 | 4/2017 | Oren | |
| 9,650,251 B2* | 5/2017 | Noyes | B01J 8/02 |
| 10,035,668 B2 | 7/2018 | Oren et al. | |
| 10,449,503 B2 | 10/2019 | Smith et al. | |
| 2004/0225085 A1* | 11/2004 | Glover | B01D 53/02 |
| | | | 526/67 |
| 2015/0291424 A1* | 10/2015 | Noyes | B01J 8/087 |
| | | | 422/187 |
| 2016/0059187 A1 | 3/2016 | Cross | |
| 2020/0199990 A1 | 6/2020 | Friesen | |

OTHER PUBLICATIONS

Standarization of European Community. "EN Jan. 6, 1993: 2007 Eurocode 3-Design of steel structures, Part 1.6: General rules—Strength and stability of shell structures." (2007). 97 pages.

Office Action in corresponding SA Application No. 121430355, mailed on Mar. 20, 2023, 7 pages.

* cited by examiner

SYSTEM AND METHOD USING A CONVERTER AND A MOVABLE STORAGE SILO FOR SPENT CATALYST

FIELD OF THE DISCLOSURE

The present disclosure relates generally to the processing of spent catalyst materials, and, more particularly, to a catalyst converter and a movable storage silo for processing and transporting spent catalysts.

BACKGROUND OF THE DISCLOSURE

The Claus process is the most significant gas desulfurizing process, recovering elemental sulfur from gaseous hydrogen sulfide. The multi-step Claus process utilizes catalysts and recovers sulfur from the gaseous hydrogen sulfide found in raw natural gas and from the by-product gases containing hydrogen sulfide derived from refining crude oil and other industrial processes.

The processing of such catalysts and the subsequent utilization of spent catalyst has not been efficient or environmentally friendly, in that processing plants and refineries in the art simply dispose of spent catalyst in landfills. Despite increased economic and environmental pressures on sweetening plants to reduce expenditures and waste generation, plants still dispose of spent catalyst in landfills.

One alternative to disposal of spent catalysts in landfills is to utilize Claus-based spent catalysts as a raw material in local cement manufacturing plants to manufacture PO cement. The addition of the spent catalyst to the raw mixture of cement substitutes bauxite and can create mortar cubes with a strength of design cement of, for example, 5,210 psi after 28 days. The chemical composition of cement produced from Claus-based spent catalysts and other raw materials are identical to the composition of cement from conventional raw materials.

SUMMARY OF THE DISCLOSURE

According to an embodiment consistent with the present disclosure, a converter and a movable storage silo are used for processing and transporting spent catalysts, which can then be utilized as an additive. Alternatively, the spent catalyst can be used as a raw material. For example, spent catalyst can be used in the manufacture of cement instead of being disposed in landfills.

In one embodiment, a catalyst converter comprises a first layer of balls, a second layer of balls, and a conveyor belt. The first layer of balls is configured to retain from below spent catalyst resulting from operation of an industrial process. The second layer of balls is configured to retain from above the spent catalyst. The conveyor belt is configured to separate the spent catalyst from dust. The first layer of balls can include ceramic balls. The second layer of balls can include aluminum balls. The conveyor belt can include a wire mesh having a plurality of apertures configured to pass particles of the spent catalyst smaller than the apertures. The wire mesh can be composed of stainless steel.

In another embodiment, a system comprises a catalyst converter, a dust removal subsystem, and a movable silo. The catalyst converter includes a first layer of balls configured to retain from below spent catalyst resulting from operation of an industrial process. The catalyst converter also includes a second layer of balls configured to retain from above the spent catalyst. The catalyst converter further includes a conveyor belt configured to separate the spent catalyst from dust. The dust removal subsystem is configured to remove the dust from the spent catalyst. The movable silo is configured to receive and store the separated spent catalyst and further configured to be transportable by a vehicle. The first layer of balls can include ceramic balls. The second layer of balls can include aluminum balls. The conveyor belt can include a wire mesh having a plurality of apertures configured to pass particles of the spent catalyst smaller than the apertures. The wire mesh can be composed of stainless steel. The dust removal subsystem can include a pipe configured to transport the dust away from the movable silo. Alternatively, the dust removal subsystem can include a hydraulic subsystem configured to hydraulically transport the dust away from the movable silo.

In a further embodiment, a method comprises supplying, to a catalyst converter, spent catalyst resulting from operation of an industrial process, and then retaining the spent catalyst with at least one layer of balls. The method then transfers the spent catalyst to a conveyor belt, separates the spent catalyst using the conveyor belt, transfers the separated catalyst to a movable silo, removes dust during the transferring of the separated catalyst to the movable silo, and transports the movable silo. The retaining step can comprise first providing a first layer of the balls within the catalyst converter prior to supplying the spent catalyst to the catalyst converter so as to be disposed beneath the spent catalyst, and second providing a second layer of the balls to cover the spent catalyst within the catalyst converter. The layer of balls can include aluminum balls covering the spent catalyst. The layer of balls can include ceramic balls beneath the spent catalyst. The conveyor belt can include a wire mesh having a plurality of apertures configured to pass particles of the spent catalyst smaller than the apertures. The wire mesh can be composed of stainless steel.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method using a catalytic converter and a movable storage silo for processing and transporting spent catalysts, which can then be utilized, for example, in the manufacture of cement instead of being disposed in landfills.

Figure 1:
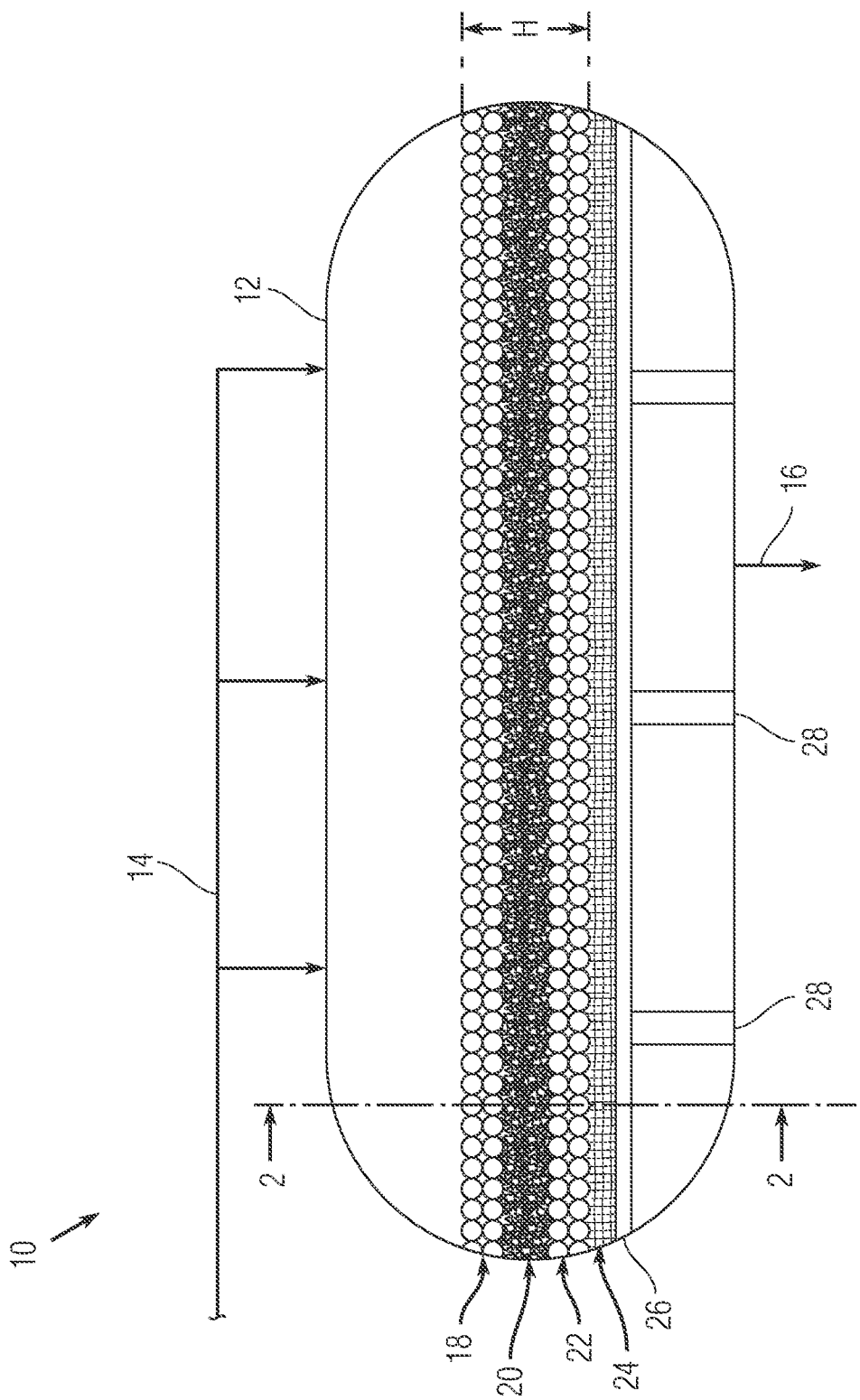
FIG. 1 is a side cross-sectional view of a catalyst converter, according to an embodiment.
Figure 2:
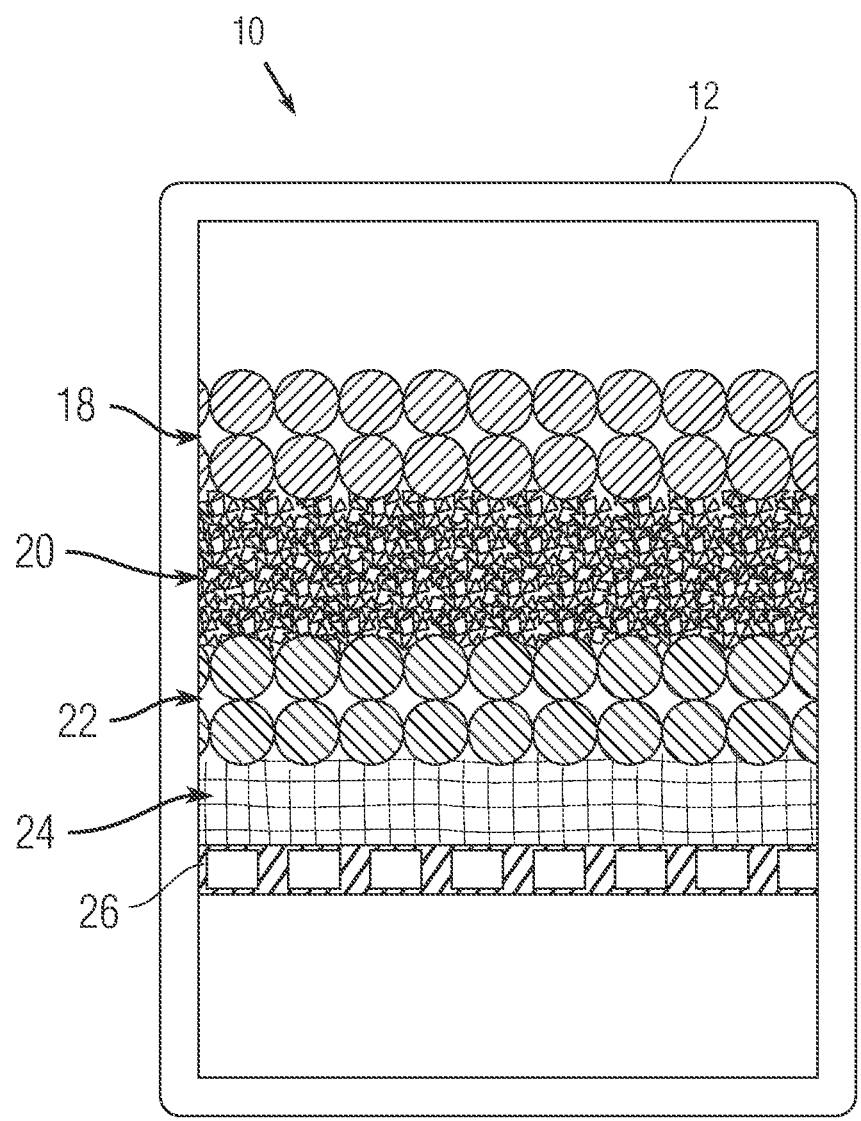
FIG. 2 is a front cross-sectional view of the catalyst converter of FIG. 1 along lines 2-2.

As shown in FIGS. 1-2, a system includes a catalyst converter 10 having a tank 12. The tank 12 is connected to a reheater by conduits 14. The tank 12 is also connected to a condenser by conduits 16. The reheater and condenser are used, for example, in a Claus process. The tank 12 includes a first layer 18 of support balls upon a bed 20 of spent catalyst. The first layer 18 can be composed of aluminum support balls. The first layer 18 can be between three inches and six inches thick. The first layer 18 can also operate as a gas distributor for any gases being expelled by the spent catalyst. The bed 20 can have a height H, such as between three feet and four feet. The bed 20 is disposed upon a second layer 22 of support balls. The second layer 22 can be composed of ceramic balls.

In an example embodiment, the ceramic balls in the second layer 22 can have the characteristics described in Tables 1-2.

TABLE 1

CERAMIC BALL - CHEMICAL PROPERTIES

| | | | |
|---|---|---|---|
| $SiO_2$ | 68% to 72% | MgO | 0.6% to 1.2% |
| $Al_2O_3$ | 17% to 23% | CaO | 0.6% to 0.9% |
| $Fe_2O_3$ | 0.4% to 0.8% | $K_2O$ | 2.3% to 3.0% |
| $TiO_2$ | 0.5% to 0.8% | $Na_2O$ | 0.5% to 0.8% |
| Soluble Fe | <0.01% | | |

TABLE 2

CERAMIC BALL - PHYSICAL PROPERTIES

| | | |
|---|---|---|
| Density | $g/cm^3$ | 2.3 to 2.4 |
| Water Absorption | % | 0.1 to 0.5 |
| Compressive Strength | $N/mm^2$ | 400 |
| Elasticity Modulus | GPa | 60 |
| Mohs Hardness | Scale | 7 to 8 |
| Specific Heat, 20° C. to 100° C. | $J/kg \cdot K$ | 840 |
| Thermal Conductivity, 30° C. to 100° C. | W/mK | 1 to 1.5 |
| Coefficient of Thermal Expansion | (20° C. to 600° C.) $10^{-6}K^{-1}$ | 4.7 |
| Heat Resistance | Up to ° C. | 1,000 |
| Shape | not applicable | spherical |
| Diameter | mm | 3 to 6 |

In addition, the characteristics of other materials are shown in Table 3.

TABLE 3

| Material: | Activated Aluminum | Titanium Dioxide | SuperClaus |
|---|---|---|---|
| Shape | Spherical | Cylindrical Extrudates | Extrudates |
| Density | 705 $kg/m^3$ | 920 $kg/m^3$ | 0.56 $g/cm^3$ |
| Crushing Strength | Min 9 daN | 2.2 daN/mm | 0.5 MPa |
| Surface Area | 300 $m^2/g$ | 130 $m^2/g$ | not applicable |
| Diameter | 3 mm to 6 mm | 3 mm to 4 mm | 1.6 mm to 2.4 mm |

The second layer 22 is positioned upon a mesh 24. The mesh 24 can be a wire mesh. The mesh 24 operates as a conveyor belt configured to transport the spent catalyst in the bed 20 to an external silo, as described below, as well as to separate the spent catalyst from dust and to separate different types of spent catalyst. In one embodiment, the mesh 24 is composed of stainless steel, which is not exposed to high temperatures or light. By using stainless steel, the mesh 24 has a high chromium content that forms an invisible layer on the stainless steel to prevent corrosion of the mesh 24.

The mesh 24 in the form of a conveyor belt separates different types of spent catalysts such as activated aluminum catalyst, super-Claus catalyst, and titanium catalyst from the ceramic balls of the second layer 22 and from dust. The conveyor belt is motorized in most embodiments and can operate as a function of whether there is catalyst to transport at any given time. Multiple meshes 24 can be used with each mesh having apertures of a specific size to hold materials of a larger size, such as the larger aluminum support balls and the ceramic support balls of the layers 18, 22, respectively. The apertures of each mesh 24 also enable materials of smaller sizes to pass through, such as particles of activated aluminum catalyst, super-Claus catalyst, and titanium catalyst, as well as dust.

The mesh 24 is positioned above a support layer 26. The support layer 26 can be a grating. The support layer 26 is mounted on a support structure 28 to position the support layer 26 and the other layers 18-24 above the bottom of the tank 12. The support layer 26 prevents any spent catalyst from migrating to the condenser through the conduit 16.

The catalyst converter 10 of FIGS. 1-2 is capable of processing, for example, 3,200 tons of materials during the replacement of catalysts beds in a gas sweetening plant. During processing of the spent catalysts, for example, 25 tons of spent catalyst can be held on the mesh 24, enabling effective separations of materials at the rates of 20 tons/hr.

Figure 3:
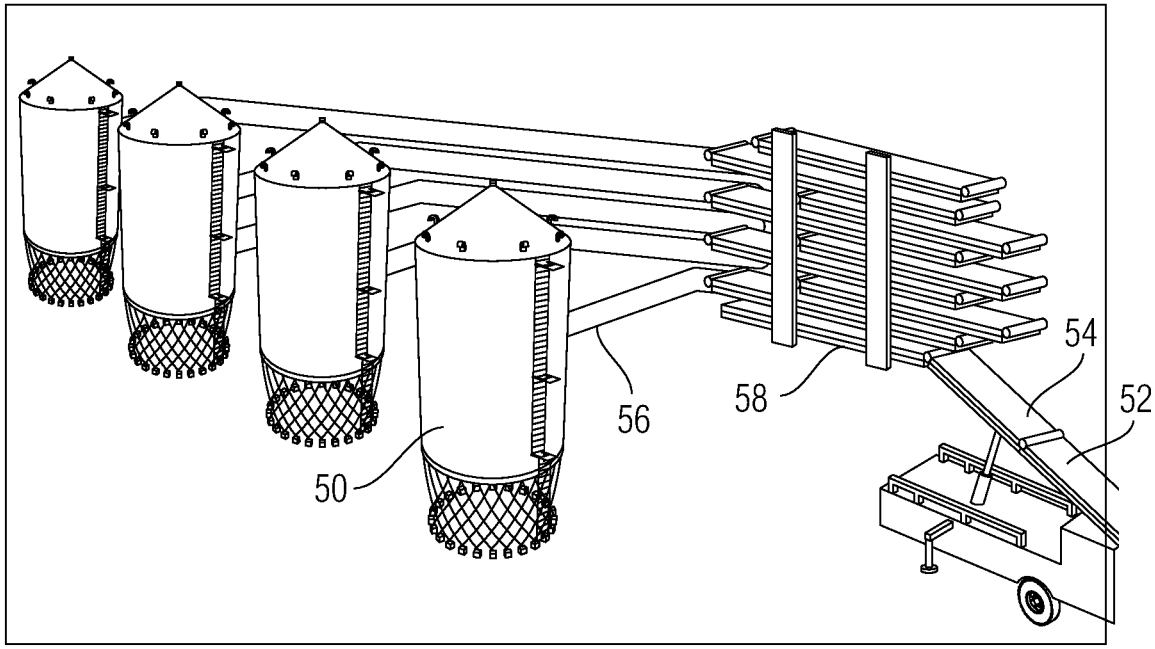
FIG. 3 is a top side perspective view of a system with silos and pipes, according to the embodiment.

Referring to FIG. 3, the system further includes a silo 50. The silo 50 can be a stainless steel silo. After processing the spent catalyst by the converter 10, the system includes a conveyor belt 52 which receives the spent catalyst and transfers the spent catalyst to the silo 50 using a transfer mechanism 54. For example, the transfer mechanism 54 can include vacuum suction devices configured to transfer the spent catalyst from the conveyor belt 52 to a pipe 56.

The silo 50 receives the spent and separated catalyst from the converter 10 through the pipe 56. The pipe 56 can be fifteen inches in diameter, by way of example and not limitation. The pipe 56 is connected to a hydraulic subsystem 58 configured to remove dust from the spent catalyst from the converter 10 by pressurized air. The silo 50 can store, for example, on the order of 320 tons of spent catalyst.

Figure 4:
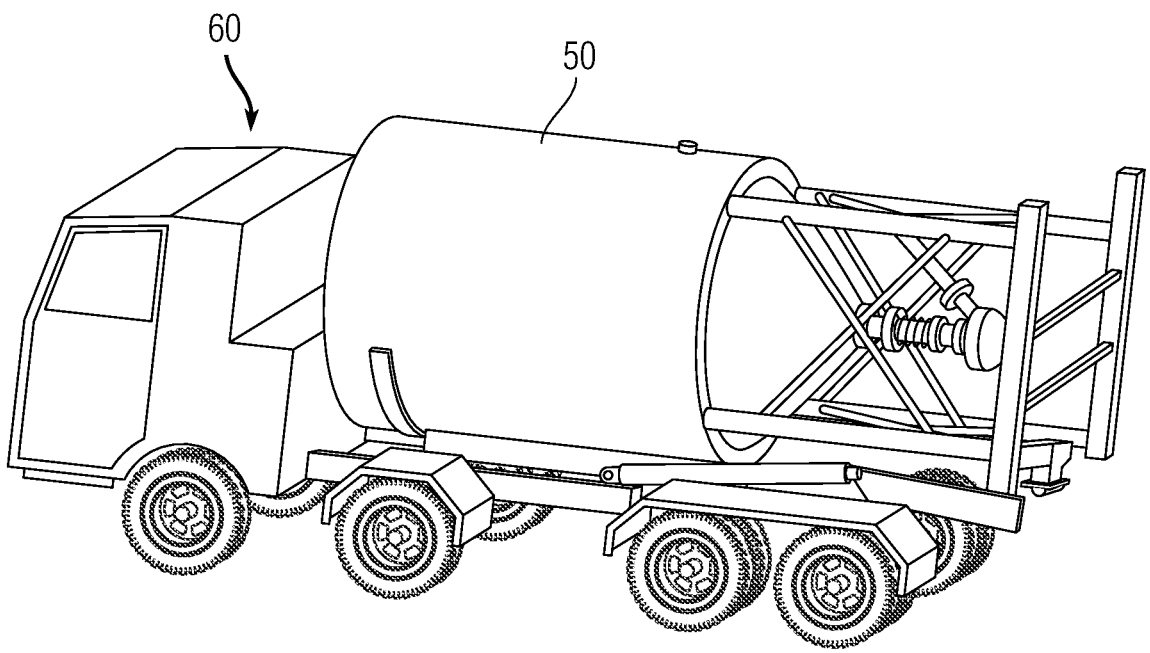
FIG. 4 is a top side perspective view of a vehicle for transporting the silo, according to the prior art.

In accordance with an important aspect of the present disclosure, the silo 50 is movable, and so the spent catalyst stored in the silo 50 can be transported to another location. For example, the spent catalyst can be delivered to a cement manufacturing plant. Referring to FIG. 4, the system also includes a vehicle 60 configured to transport the silo 50 having the spent catalyst. The vehicle 60 can be a truck. Alternatively, the vehicle 60 can be a railroad car configured to receive the silo 50 having the spent catalyst. Once the silo 50 has been filled with the transferred, separated catalyst, it can be moved and a further silo positioned to receive additional separated catalyst.

Figure 5:
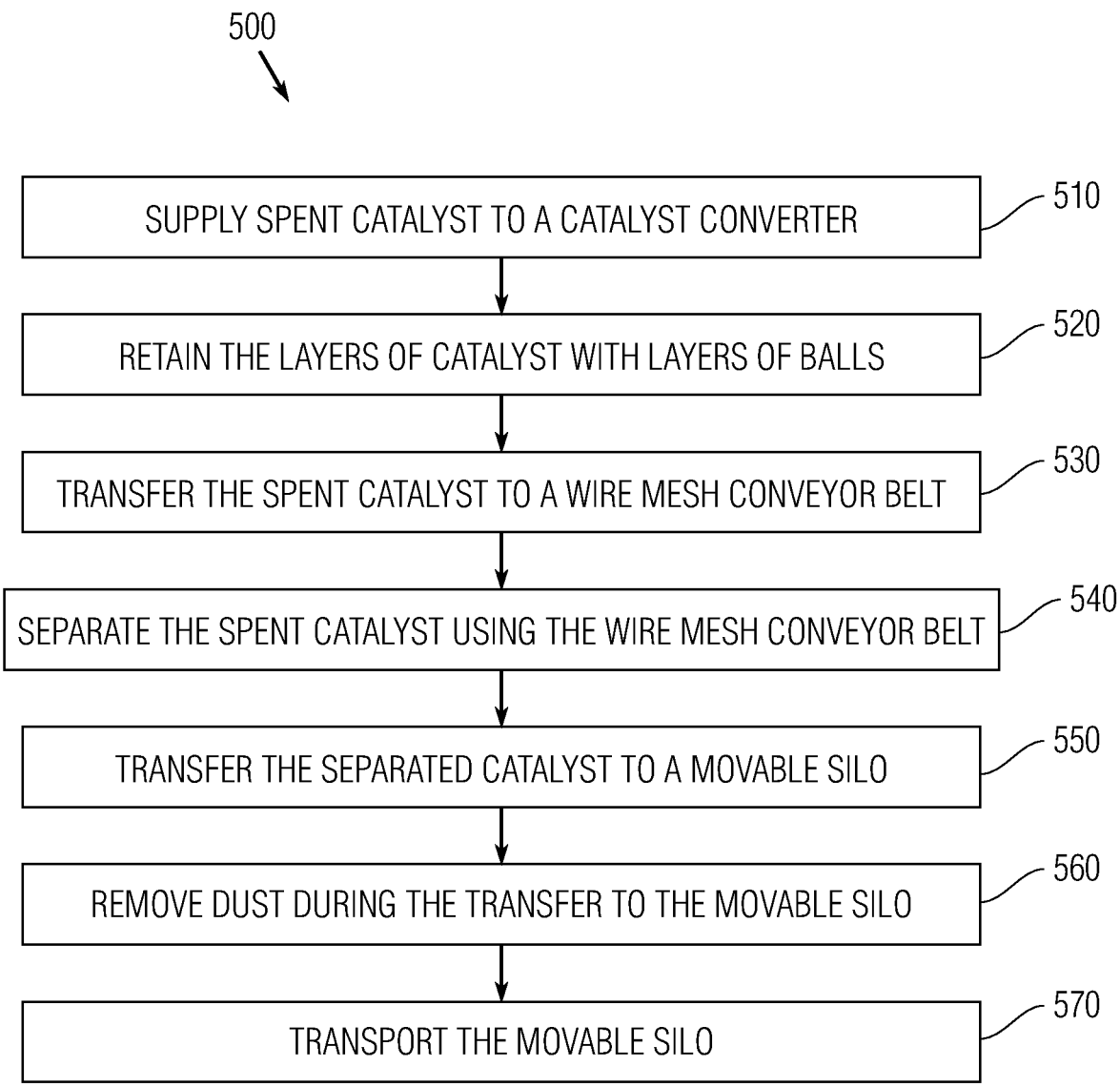
FIG. 5 is a flowchart of a method, according to the embodiment.

Referring to FIG. 5, a method 500 includes the step 510 of supplying spent catalyst to a catalyst converter 10, as shown in FIGS. 1-2. The method then includes the step 520 of retaining the spent catalyst with layers 18, 22 of balls in the tank 12. The method 500 then transfers the spent catalyst to a wire mesh 24 configured as a conveyor belt in step 530. The spent catalyst is retained as a bed 20 between the layers 18, 22, which are upon the mesh 24. The method 500 separates the spent catalyst using the wire mesh 24 in step 540. The mesh 24 in the form of a conveyor belt separates different types of spent catalysts such as activated aluminum catalyst, super-Claus catalyst, and titanium catalyst from the ceramic balls of the second layer 22 and from dust.

The method 500 transfers the separated catalyst to a movable silo 50 in step 550 using the conveyor belt 52, transfer mechanism 54, pipe 56, and a hydraulic sub-system 58 shown in FIG. 3. The method 500 removes dust during the transfer of spent catalyst to the movable silo 50 using the hydraulic sub-system 58 in step 560. The method 500 then transports the movable silo 50 storing the spent catalyst in step 570 using the vehicle 60 in FIG. 4.

Portions of the methods described herein can be performed by software or firmware in machine readable form on a tangible (e.g., non-transitory) storage medium. For example, the software or firmware can be in the form of a computer program including computer program code adapted to cause the catalyst converter to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A catalyst converter, comprising:
   a tank having an interior;
   a layer of balls within the interior of the tank and configured to retain from above and within the interior spent catalyst and dust resulting from operation of an industrial process; and
   a conveyor belt having a portion thereof within and in continuous communication with the interior of the tank, wherein the conveyor belt includes a mesh removably holding the spent catalyst thereon, and
   wherein the conveyor belt is configured to transport the spent catalyst externally to a vacuum suction device for removal of the spent catalyst from upon the conveyor belt.

2. The catalyst converter of claim 1, wherein the conveyor belt is composed of stainless steel.

3. A system, comprising:
   a vacuum suction device;
   a catalyst converter including:
      a tank having an interior;
      a layer of balls within the interior of the tank and configured to retain from above and within the interior spent catalyst and dust resulting from operation of an industrial process; and
      a conveyor belt having a portion thereof within and in continuous communication with the interior of the tank, wherein the conveyor belt includes a mesh removably holding the spent catalyst thereon, and
      wherein the conveyor belt is configured to transport the spent catalyst externally to the vacuum suction device for removal of the spent catalyst from upon the conveyor belt;
   a dust removal subsystem configured to remove the dust from the spent catalyst; and
   a movable silo configured to receive the spent catalyst removed from upon the conveyor belt and transferred by the vacuum suction device, and to store the spent catalyst, and further configured to be transportable by a vehicle.

4. The system of claim 3, wherein the conveyor belt is composed of stainless steel.

5. The system of claim 3, wherein the dust removal subsystem includes a pipe configured to transport the removed dust away from the movable silo.

6. The system of claim 3, wherein the dust removal subsystem includes a hydraulic subsystem configured to hydraulically transport the removed dust away from the movable silo.

7. A method, comprising:
   providing a catalyst converter including a tank having an interior, a layer of balls with the interior of the tank, and a conveyor belt having a mesh and a portion thereof within and in continuous communication with the interior of the tank;

supplying, to the catalyst converter, spent catalyst and dust resulting from operation of an industrial process;

retaining from above and within the interior the spent catalyst and the dust with the layer of balls;

removably holding the spent catalyst on the mesh of the conveyor belt;

transporting the spent catalyst externally to a vacuum suction device using the conveyor belt removably holding the spent catalyst thereon;

removing the dust from the spent catalyst using a dust removal subsystem;

removing the spent catalyst from upon the conveyor belt using the vacuum suction device;

transferring the spent catalyst to a movable silo using the vacuum suction device; and transporting the movable silo.

8. The method of claim 7, wherein the retaining step comprises covering the spent catalyst with the layer of balls within the catalyst converter.

9. The method of claim 7, wherein the conveyor belt is composed of stainless steel.

* * * * *